Sept. 7, 1965   A. C. DE MATTHEW   3,204,559
ROCKET PROPELLANT CHARGE IGNITER
Filed Dec. 31, 1962   2 Sheets-Sheet 1

INVENTOR.
ANTHONY C. DeMATTHEW
BY
ATTORNEYS.

Sept. 7, 1965  A. C. DE MATTHEW  3,204,559
ROCKET PROPELLANT CHARGE IGNITER
Filed Dec. 31, 1962  2 Sheets-Sheet 2

INVENTOR.
ANTHONY C. DeMATTHEW
BY
ATTORNEYS.

United States Patent Office 3,204,559
Patented Sept. 7, 1965

3,204,559
ROCKET PROPELLANT CHARGE IGNITER
Anthony C. De Matthew, Bloomington, Minn., assignor to Avco Corporation, Richmond, Ind., a corporation of Delaware
Filed Dec. 31, 1962, Ser. No. 248,565
2 Claims. (Cl. 102—49)

The present invention relates to solid-fuel type rockets, and specifically to igniter devices. In using the present invention, a rocket is fired from a gun by conventional methods for projectile firing—i.e., external gas pressure exerted effectively on the base of the rocket. This gas pressure not only impels the rocket bodily away from the gun, but also actuates a firing pin which, through a suitable primer and ignition train, causes burning of the rocket propellant itself. During the initial travel of the rocket the throat of the rocket is sealed. When the rocket propellant has built up a predetermined pressure in the chamber, the seal is broken and the rocket is thereafter propelled by the products of combustion flowing from its throat.

The primary object of the invention is to provide for uniformity of rocket "take-off" conditions. That is, the seal establishes a standard in the sense that it is broken when the rocket propellant gases achieve a desired predetermined value. This standard being provided, rocket thrusts and trajectories are controlled and predicted with a higher order of accuracy.

Another object of the invention is to provide an igniter device which is characterized by enhanced reliability, safe handling, simplicity, ease of installation, low cost, and capability of manufacture by mass production techniques.

A further object of the invention is to provide a rocket igniter which in operation is substantially free from recoil.

It is also an object of the invention to provide an igniter which is purely mechanical, which has no electrical components, and which exploits existing pressure for the performance of its intermediate functions.

For a better understanding of the invention, together with other and further objects, advantages, and capabilities thereof, reference is made to the following description of the appended drawing, in which.

Figure 1:
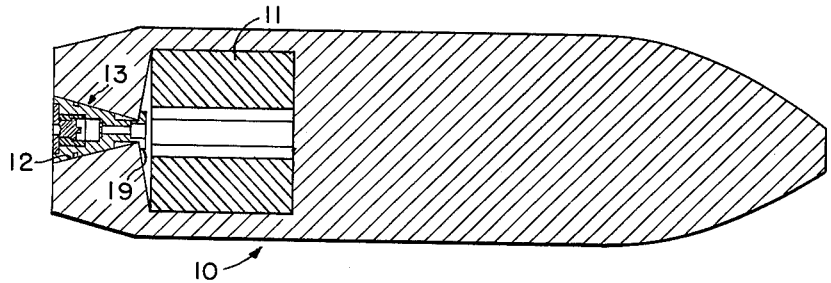
FIG. 1 is an axial sectional view of a rocket with a preferred embodiment of igniter in accordance with the invention in place.

The preferred igniter shown is installed in the base of a rocket 10. A section of the rocket is suitably bored to provide a chamber for a solid fuel propellant 11. This chamber communicates with a nozzle 12 formed in the rear of the rocket. It will be understood that the thrust of the rocket is caused by the flow of the products of combustion from the propellant chamber through the nozzle 12, when the rocket is in conventional flight.

The igniter comprises a metallic housing 13 which is frusto-conical in shape to adapt it for insertion in nozzle 12. This housing is formed with a stepped interior bore having a first section 14, a second section 15, a third section 16, and a fourth section 17. These sections are of decreasing diameter, progressing from rear to front. The forward bore section is interiorly threaded. A forwardly extending stem 18 is threaded into this forward section. The stem 18 is hollow and is formed with an anchor portion 19 secured to the rocket by abutment against wall 20. The stem 18 also has an intermediate thin-walled or frangible section 21 and, as indicated, an exteriorly screw-threaded portion 22. An interior charge is disposed within stem 18 in communication with the rocket propellant 11. This charge comprises an ignition charge portion 23 and a delay charge portion 24. Disposed within the third bore section 16 of the housing is a primer 25. A metallic baffle 26, formed with transverse ports, is interposed between the primer 25 and stem 18. A two-piece split metallic collar 27 is concentrically disposed within the second bore 15 of housing 13. This firing pin support collar is interiorly flanged at 28. Concentrically disposed in collar 27 is the main body of a firing pin 29, the latter being formed with an integral annular shoulder 30 which abuts the flange of the collar. The firing pin is further formed with an integral annular washer portion 31 and an intermediate frangible portion 32, the washer portion fittting into the first bore 14 and being secured therein by machine screws 34 and 35. The elements 13, 18, 26 and 29 may be formed of any suitable material, such as aluminum.

Attention is invited at this point to the ease and simplicity of assembly of this igniter. The charge elements 24 and 23 are simply inserted in the stem. The primer 25 is inserted in the third bore, then the baffle 26 is located and the stem simply screwed into the fourth bore of the housing. The subassembly of split collar 27 and firing pin 29 is inserted into the second bore, and the washer portion 31 pressed into the first bore of the housing, whereupon the rear part of the assembly is completed by machine screws 34 and 35. It will further be noted that each of the mechanical parts may easily be made, formed, and finished by fundamental and well-established manufacturing techniques.

Figure 2:
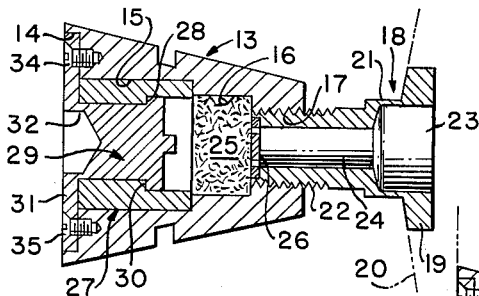
FIGS. 2, 3, 5 and 6 are axial sectional views of the igniter showing the relative positions of the parts at the following stages of operation: (1) before firing, (2) the firing pin release stage, (3) the firing pin retract stage, (4) the rocket "take-off" stage, respectively.
Figure 3:
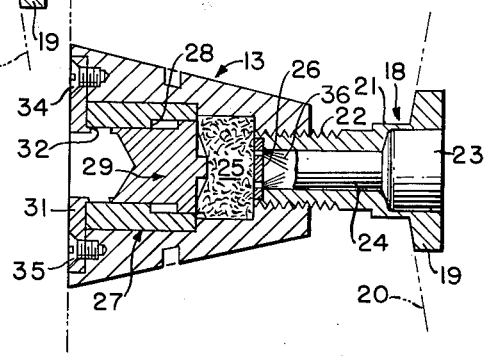
Figure 5:
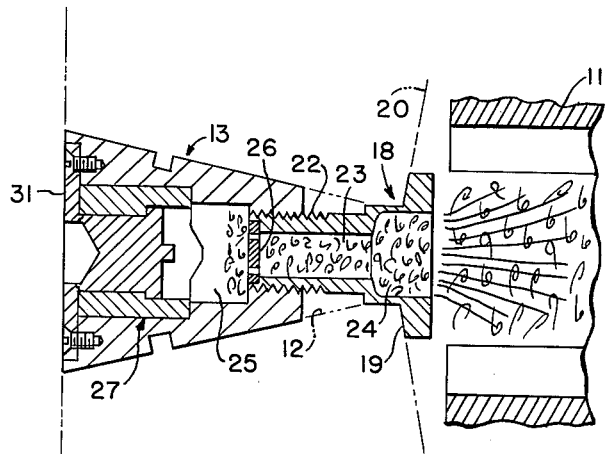

Considering now the operation of the igniter in accordance with the invention, let it be postulated that the rocket is suitably located in a gun and that suitable firing arrangements are provided for the extersion of gas pressure against the rear of firing pin 29. This pressure causes firing pin 29 to advance in a forward direction from the position illustrated in FIG. 2 to that shown in FIG. 3, breaking the frangible section 32 of the firing pin, so that the firing pin impinges on the primer 25 and ignites it by percussion. The ignition of the train comprising the elements 24 and 23 generates gas pressures at 36 (FIG. 3), and the ignition gases flow through the baffle 26, resetting the firing pin 29 in the position shown in FIG. 5, the annular shoulder of the firing pin butting against the flanged wall of the collar 27 to provide a gas seal. It will be observed, at the FIG. 5 stage of the cycle of operation, that, while the rocket is traveling (having been impelled by gas pressures against its base), the nozzle of the rocket is still capped by the igniter and the just-mentioned sealing action prevents the escape of gases from the propellant chamber of the rocket.

Figure 6:
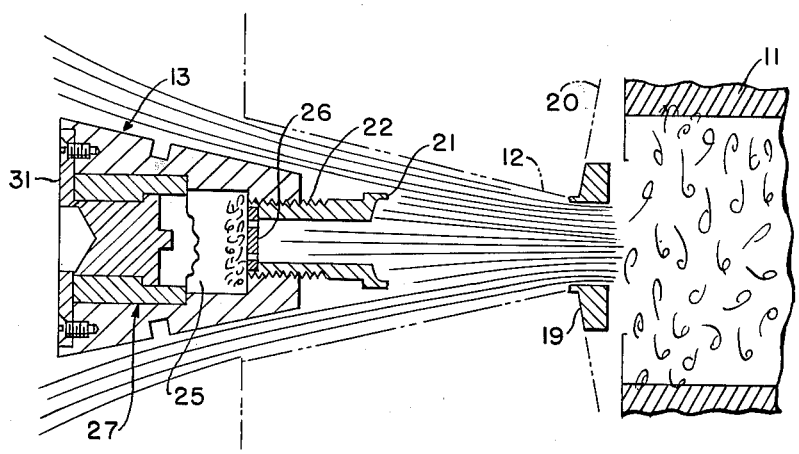

Now, the ignition train 24, 23 in due course ignites the rocket propellant 11, resulting in the generation of propulsion gases which eventually build up a standardized, desired, predetermined pressure. The build-up of this pressure causes frangible section 21 to rupture, whereupon all of the igniter parts aft of the broken section 21 are discharged rearwardly (as shown in FIG. 6), thereby opening up the rocket nozzle so that rocket thrust action "takes over." It should be noted that this take-over occurs, not at some random or happenstance value of the pressure of the rocket propellant gases, but at a value which is functionally related to the strength of the wall section 21.

Thus it will be seen that, in accordance with the invention, there is provided, in a rocket firing mechanism, the combination including a frusto-conical housing 13 shaped to complement the nozzle of a rocket 10 and formed with a stepped interior bore having sections of decreasing diameter 14, 15, 16, and 17. The invention further comprises a forwardly extending stem 18 formed with an anchor portion 19 secured to the rocket, an intermediate frangible portion 21, and a screw-threaded portion 22 engaging the housing. An interior charge 23, 24 is disposed within the stem in communication with the rocket propellant. Further in accordance with the invention, the primer 25 is disposed within section 16, and the baffle 26, suitably ported, is placed intermediate primer and stem. Further in accordance with the invention there is provided the flanged collar 27. The concentric firing pin has its main portion within that collar, the firing pin and collar being formed with machined or very closely mated sealing surfaces, and the firing pin being further formed with a supporting portion secured in section 14 and with an intermediate frangible portion 32. The invention functions in such a way that, on exertion of pressure (provided by means not shown) against the rear of the firing pin, the firing pin breaks frangible portion 32 and advances in a forward direction to impact and ignite primer 25. The ignition charge 24, 23 then generates gas flow pressure through the baffle 26, so that the firing pin 29 is retracted to cause the sealing surfaces to abut and function as a seal. Finally in accordance with the invention, the pressure generated by the burning propellant 11 breaks the frangible portion 21 of the stem 18 and opens the nozzle 12 when the pressure of the propellant gases attains a desired predetermined value.

Figure 4:
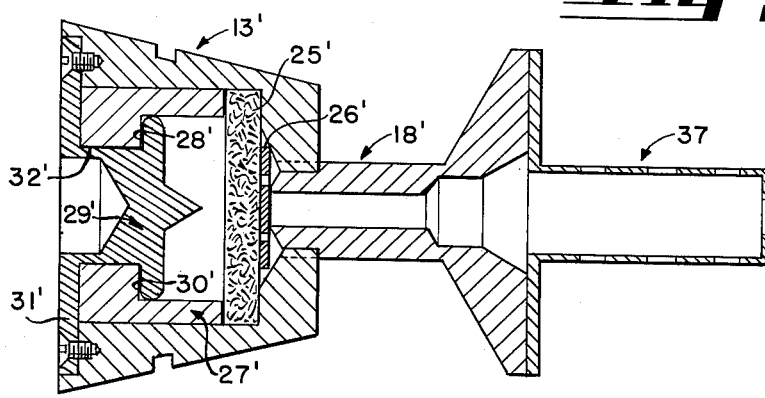
FIG. 4 is an axial section showing the igniter as applied to a stab-type primer.

In FIG. 4 there is shown a stab-type primer in section and skeleton outline. Those elements of the FIG. 4 embodiment which correspond to the elements of the FIGS. 1–3 and 5–6 embodiment are designated by identical reference numerals primed, so that they need not be further described herein. The principal difference between the two embodiments resides in the fact that, in the FIG. 4 embodiment, a booster housing 37 has been added to the front of the stem, designated as 18' in FIG. 4.

While there have been shown and described what are considered to be the preferred embodiments of the present invention, it will be understood by those skilled in the art that various modifications and changes may be made therein without departing from the scope of the invention as defined by the appended claims.

I claim:
1. A rocket firing mechanism adapted to be anchored at its front to a rocket, comprising the combination of:
   a frusto-conical housing shaped to complement the nozzle of a rocket and formed with a rear face and a stepped interior bore having first, second, third and fourth sections of decreasing diameter, counting from rear to front, the fourth and smallest of said bore sections being interiorly screw-threaded, the first of said bore sections terminating in an annular rear face for said housing;
   a forwardly extending hollow stem formed with an anchor portion secured to the rocket and an intermediate frangible portion and a screw-threaded portion engaging said interior threads;
   an ignition charge disposed within said stem in communication with the rocket propellant;
   a primer disposed within the third bore section;
   a split collar having a forwardly facing annular shoulder and disposed within said second bore section;
   a baffle formed with ports and located between said primer and stem;
   a concentric firing pin secured within said collar, said firing pin being formed with an integral rearwardly facing annular shoulder normally abutting said forwardly facing shoulder and an integral annular rearwardly facing and radially outwardly extending flange portion in said first bore section and secured to said rear face and an integral intermediate frangible portion;
   whereby, on exertion of pressure against the rear of said firing pin, the firing pin breaks its frangible portion and advances in a forward direction to impact and ignite said primer, the ignition charge then generating pressure and gas flow rearwardly through the baffle so that the firing pin is retracted to place said rearwardly facing shoulder against said forwardly facing shoulder to form a seal, whereupon the burning propellant in the rocket breaks the frangible portion of said stem and opens said nozzle when the pressure of the propellant gases attains a predetermined value.

2. A rocket firing mechanism adapted to be anchored at its front to a rocket, comprising the combination of:
   a frusto-conical housing shaped to complement the nozzle of a rocket and formed with a rear face and a stepped interior bore having sections of decreasing diameter, counting from rear to front;
   a frangible hollow stem secured to the front bore section and adapted to be secured to a rocket;
   a primer disposed within a bore section behind said stem;
   a split collar having a forwardly facing annular shoulder and disposed within a bore section behind said primer;
   a concentric firing pin secured within said collar, said firing pin being formed with an integral rearwardly facing annular shoulder normally abutting said forwardly facing shoulder and an integral annular rearwardly facing and radially outwardly extending flange portion secured to said rear face and an integral intermediate frangible portion;
   whereby, on exertion of pressure against the rear of said firing pin, the firing pin breaks its frangible portion and advances in a forward direction to impact and ignite said primer, the ignition charge then generating pressure and gas flow so that the firing pin is retracted to place the rearwardly facing shoulder of the firing pin against said forwardly facing shoulder to form a seal, whereupon the burning propellant in the rocket breaks said stem and opens said nozzle when the pressure of the propellant gases attains a predetermined value.

References Cited by the Examiner

UNITED STATES PATENTS 2,457,839   1/49   Skinner _____ 102—49
2,693,757   11/54  Brandt _____ 102—49

FOREIGN PATENTS 14,000    1896    Great Britain.
662,429   12/51   Great Britain.

SAMUEL FEINBERG, *Primary Examiner.*